(12) United States Patent  
Mills

(10) Patent No.: US 8,688,463 B2  
(45) Date of Patent: Apr. 1, 2014

(54) SYSTEM AND METHOD FOR AUTOMATIC RESPONSE PIECE INFORMATION RETRIEVAL

(75) Inventor: Steven E. Mills, Annandale, VA (US)

(73) Assignee: The United States Postal Service, Washington, DC (US)

( * ) Notice: Subject to any disclaimer, the term of this patent is extended or adjusted under 35 U.S.C. 154(b) by 1310 days.

(21) Appl. No.: 11/242,924

(22) Filed: Oct. 5, 2005

(65) Prior Publication Data

US 2006/0224407 A1    Oct. 5, 2006

Related U.S. Application Data

(60) Provisional application No. 60/616,117, filed on Oct. 6, 2004, provisional application No. 60/629,317, filed on Nov. 19, 2004.

(51) Int. Cl.
```
G06Q 10/00    (2012.01)
G06Q 30/00    (2012.01)
G06F 17/00    (2006.01)
G06G 7/00     (2006.01)
```

(52) U.S. Cl.
USPC .............................. 705/1.1; 705/330; 705/401

(58) Field of Classification Search
USPC ......... 705/1.1, 7.11–7.42, 330–341, 400–418
See application file for complete search history.

(56) References Cited

U.S. PATENT DOCUMENTS

| | | | |
|---|---|---|---|
| 6,415,336 B1 * | 7/2002 | Sansone | 710/5 |
| 6,459,953 B1 * | 10/2002 | Connelly et al. | 700/224 |
| 6,775,590 B2 * | 8/2004 | Pintsov et al. | 700/224 |
| 6,804,577 B2 | 10/2004 | Ferrara et al. | |
| 7,131,572 B2 | 11/2006 | Miller et al. | |
| 2003/0163421 A1 * | 8/2003 | Van Ness et al. | 705/40 |
| 2004/0139033 A1 * | 7/2004 | Amato | 705/400 |
| 2005/0071288 A1 * | 3/2005 | Sansone et al. | 705/401 |

OTHER PUBLICATIONS

Notification of Transmittal of The International Search Report and The Written Opinion of the International Searching Authority, or the Declaration; Date of Mailing: Feb. 26, 2007.
First Notification of Office Action issued by the Chinese Patent Office in corresponding Chinese Patent Application No. 200580034256.3 on Dec. 5, 2008 (8 pages).
English-language Translation of the First Notification of Office Action issued by the Chinese Patent Office in corresponding Chinese Patent Application No. 200580034256.3 on Dec. 5, 2008 (13 pages).
Extended European Search Report mailed May 29, 2009, in European Application No. 05809881.5-1238/1815351 (9 pages).
New Zealand Examination Report mailed May 8, 2009, in New Zealand Application No. 554471 (1 page).

(Continued)

*Primary Examiner* — George Chen
(74) *Attorney, Agent, or Firm* — Finnegan, Henderson, Farabow, Garrett & Dunner, LLP

(57) ABSTRACT

Disclosed is a system, method, and medium for automatically analyzing response pieces. The system may scan the response piece, identify the response piece, and generate an image from the response piece. The system also processes the image. Processing the image may include determining response piece identification information and sending the response piece identification information to an accounting system to update an account associated with the response piece identification information. Processing the image may also include reading information from the response piece.

28 Claims, 15 Drawing Sheets

(56) References Cited

OTHER PUBLICATIONS

International Preliminary Report on Patentability mailed Apr. 19, 2007, in counterpart International Patent Application No. PCT/US2005/036416 (6 pages).
Examiner's Assessment from the New Zealand Patent Office, dated Aug. 8, 2011 (2 pages).
Examiner's Second Report from the Australian Patent Office in corresponding Australian Patent Application No. 2005295028, dated May 23, 2011 (3 pages).
Notice of Opposition to Grant of Patent in New Zealand, dated Jan. 14, 2011 (3 pages).
Examiner's First Report from the Australian Patent Office in corresponding Australian Patent Application No. 2005295028, dated Apr. 27, 2010 (2 pages).
Second Notification of Office Action issued by the Chinese Patent Office in corresponding Chinese Patent Application No. 200580034256.3 on Jun. 5, 2009 (15 pages).
English-language Translation of the Second Notification of Office Action issued by the Chinese Patent Office in corresponding Chinese Patent Application No. 200580034256.3 on Jun. 5, 2009 (16 pages).
Statement of Case in New Zealand, dated Mar. 30, 2011 (10 pages).

* cited by examiner

SYSTEM AND METHOD FOR AUTOMATIC RESPONSE PIECE INFORMATION RETRIEVAL

RELATED APPLICATION

This application claims priority benefit based on U.S. provisional applications No. 60/616,117, filed on Oct. 6, 2004, and No. 60/629,317, filed on Nov. 19, 2004, the technical disclosures of which are hereby incorporated by reference.

TECHNICAL FIELD

This invention relates generally to scanning response pieces and, more particularly, to a system and method for automatically analyzing a response piece.

BACKGROUND

A response piece refers to a pre-addressed delivery item, such as a postcard, letter, or envelope, provided by a sender to third parties, such as customers. Typically, a response piece by a sender, such as a mailer, is provided to elicit and, in some instances, expedite responses from third parties and to provide more accurate delivery. For example, a magazine publisher may provide a response piece to its subscribers to elicit and expedite responses from its subscribers. Such responses may include a customer name and address information, subscription information, and/or payment information.

There are two types of response pieces: a prepaid response piece and an unpaid response piece. A prepaid response piece refers to a response piece that requires the mailer (e.g., magazine publisher) to pay the postage when it is returned. Examples of prepaid response pieces include Business Reply Mail™ (BRM) and Qualified Business Reply Mail™ (QBRM) provided by the United States Postal Service™ (USPS™). An unpaid response piece refers to a response piece that requires the sender (e.g., magazine publisher) to pay the postage before mailing. An example of an unpaid response piece is Courtesy Reply Mail™ (CRM) from the USPS™.

When a response piece is returned by a third party, it is advantageous to determine relevant information from the response piece. For example, the sender is charged a delivery fee for prepaid response pieces, based on the number of prepaid response pieces that are returned. A delivery service processing facility, such as a postal processing facility within the USPS™, determines the number of returned response pieces using a variety of cumbersome methods including manually counting the returned response pieces, weight-averaging the returned response pieces, and generating reports at the end of a processing run. Therefore, it is desirable to provide a response piece information retrieval system to automatically determine the number of returned response pieces.

In addition, a sender will often send out a response piece to solicit information. For example, a magazine can send out response pieces to solicit subscription information from its subscribers. Upon receiving the returned response piece, the sender must then process the information provided by the third party. It is desirable to provide a response piece information retrieval system to automatically process information from the response piece.

SUMMARY

Consistent with the invention, there is provided a computer-implemented method for retrieving information from response pieces. The method includes electronically analyzing the response piece during mail processing; identifying the response piece during mail processing; generating an image from the analyzed response piece; processing the image; and providing the image to a user. Processing the image can include determining response piece identification information and sending the response piece identification information to an accounting system to update an account associated with the response piece identification information. Processing the image can also include reading information from the response piece.

Also provided is a system for analyzing response pieces. The system includes a response piece scanner for scanning the response piece, identifying the response piece and generating an image from the response piece. The system also includes an image server that may include a processing application for processing the image. Processing the image may include determining response piece identification information and sending the response piece identification information to an accounting system to update an account associated with the response piece identification information. Processing the image may also include reading information from the response piece.

Further provided is a computer-readable medium containing instructions to configure a data processor to perform a method for creating a response piece mailpiece. The instructions include a method comprising electronically scanning the response piece during mail processing; identifying the response piece during mail processing; generating an image from the scanned response piece; processing the image; and providing the image to a user. Processing the image can also include determining response piece identification information and sending the response piece identification information to an accounting system.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

DETAILED DESCRIPTION

Reference will now be made in detail to an exemplary embodiment consistent with the invention, an example of which is illustrated in the accompanying drawings. Wherever possible, the same reference numbers will be used throughout the drawings to refer to the same or like parts. Although embodiments are described with respect to a mail system, the invention is not so limited. Rather, the invention may be employed with many types of delivery systems.

Figure 1:
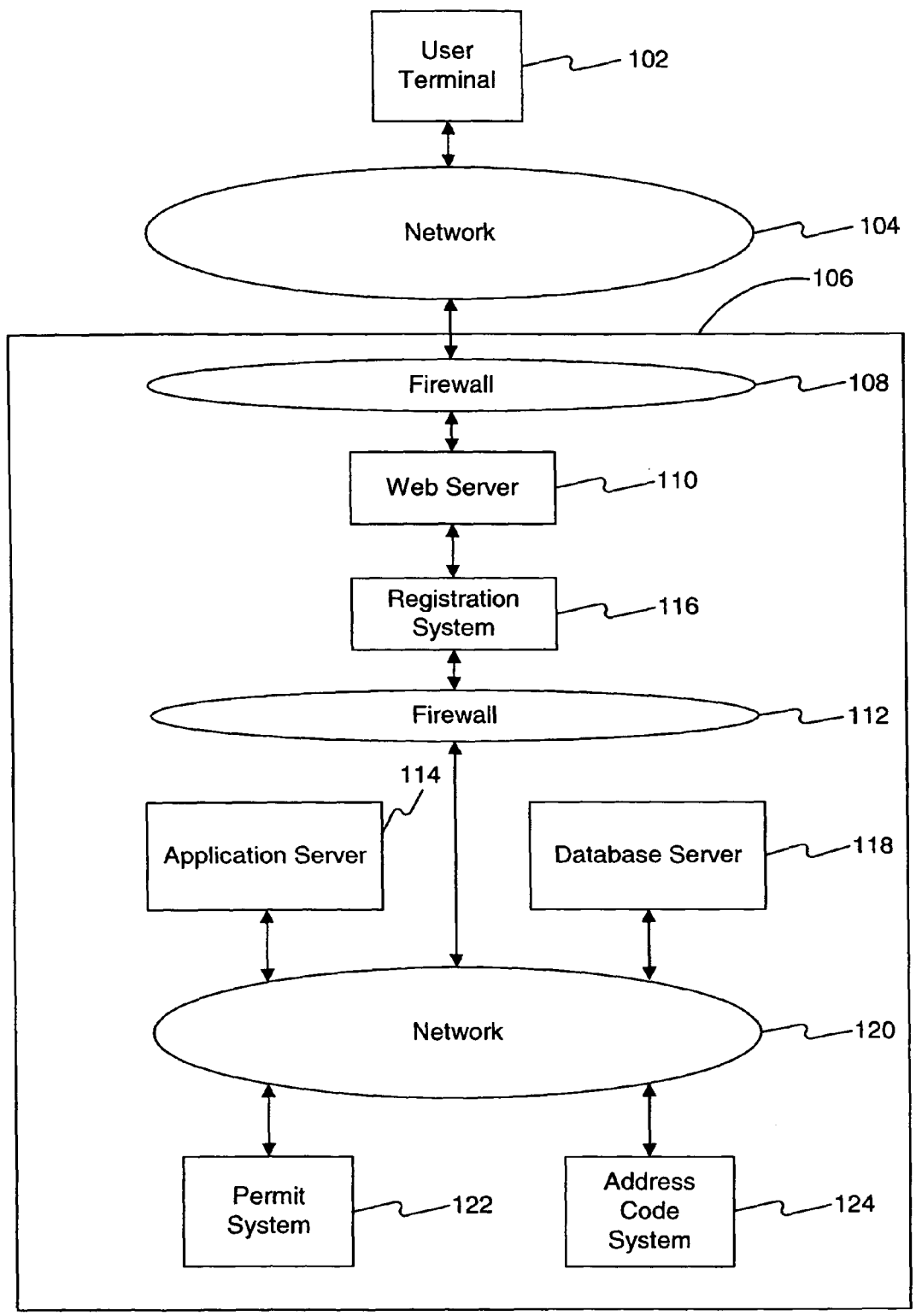
FIG. 1 depicts a block diagram of an exemplary system environment of an automated response piece system, consistent with the present invention.

FIG. 1 depicts a block diagram of an exemplary system environment of an automated response piece system, consistent with the present invention. As illustrated, a user terminal 102 connects to a network 104. Network 104 may be implemented through any suitable combination of wired and/or wireless communication networks. For example, network 104 may be implemented through a wide area network (WAN), local area network (LAN), an intranet, and/or the Internet. Additionally, network 104 may utilize any suitable type of network protocol. For ease of explanation, network 104 will be hereinafter referred to as Internet 104 and will be assumed to use Transport Control Protocol/Internet Protocol (TCP/IP). User terminal 102 may be any appropriate type of a user terminal, and may be, for example, a user computer or data processor executing a Web browser type program, such as Microsoft's Internet Explorer or Apple Safari. Accordingly, user terminal 102 may include a processor, memory, storage, and an interface for connecting to Internet 104.

Additionally, an automated response piece system 106 connects to Internet 104. As illustrated, automated response piece system 106 includes a Web server 110 connected to Internet 104 via a firewall 108. In one embodiment, automated response piece system 106 communicates with user terminal 102 using Web server 110. Web server 110 may be any appropriate type of data processor or computer and may include, for example, a processor, memory, storage, and interfaces. Web server 110, in one embodiment, stores a set of Web pages for interfacing with user terminal 102. User terminal 102 sends information to Web server 110, which may then send the information to other systems and subsystems of automated response piece system 106, such as a registration system 116 or an application server 114. Similarly, to send information to user terminal 102, the systems and subsystems of automated response piece system 106 send information to Web server 114, which formats the information and sends it to user terminal 102.

Registration system 116 functions to register and authenticate users of automated response piece system 106. In one embodiment, registration system 116 may include at least one data processor or computer, and at least one database for storing user authentication data. Registration system 116 connects to a network 120 through a firewall 112. Firewalls 108 and 112 may be any appropriate type of firewall, such as, for example, commercially available firewalls. Once a user has been authenticated, registration system 116 authorizes user terminal 102 to communicate with application server 114 through Web server 110 and network 120.

Network 120 connects the systems associated with automated response piece system 106. Network 120 may be, for example, an internal network for an organization providing delivery services. For ease in explanation, network 120 will be hereinafter referred to as intranet 120. One of skill in the art will recognize, however, that intranet 120, in other embodiments, may be any type of communication medium or channel and may include, alone or in any suitable combination, a telephony-based network, a LAN, a WAN, a dedicated intranet, the Internet, a wireless network, or a bus. Moreover, in one embodiment, network 106 may include or be a part of a communications network, such as the Internet or a corporate intranet that is compatible with a networking protocol such as TCP/IP.

A database server 118 stores data associated with users of automated response piece system 106. Database server 118 may store information that can be accessed through a conventional database protocol, such as Structured Query Language (SQL). Although not depicted in FIG. 1, one of ordinary skill in the art will recognize that database server 118 may include a computer or data processor for accessing, searching, and/or processing stored information. Further, one of ordinary skill in the art will recognize that database server 118 may be implemented using a plurality of databases.

A permit system 122 functions to authorize a response piece permit, such as a BRM permit from the USPS™, and also functions to process payments of fees associated with the response piece permit. Permit system 122 may be implemented as a computer or network of computers and a database or set of databases that receives information associated with a user's request to apply for a response piece permit or to pay response piece permit fees, processes the information, and provides a valid response piece permit and/or a confirmation of payment in response. An example of such a system is the USPS's Postal One!® system. Processing payment of response piece fees may include debiting an account, verifying credit card information, or performing an Electronic Fund Transfer (EFT) on an Automated Clearing House (ACH) account, as is understood by one of skill in the art. An example of an ACH account is a Centralized Accounting Payment System (CAPS) account from the USPS™.

An address code system 124 functions to provide a standardized address and a unique address code. As will be understood by one of skill in the art, the address code can then be converted to a bar code, which will be read by mail processing equipment to ensure efficient and accurate delivery of the returned response piece. Address code system 124 may be implemented as a computer or network of computers and a database or set of databases that receives information associated with a user's request to apply for an address code, standardizes the address information, and provides a unique address code. An example of such a system is the USPS's Address Management System.

Figure 2:
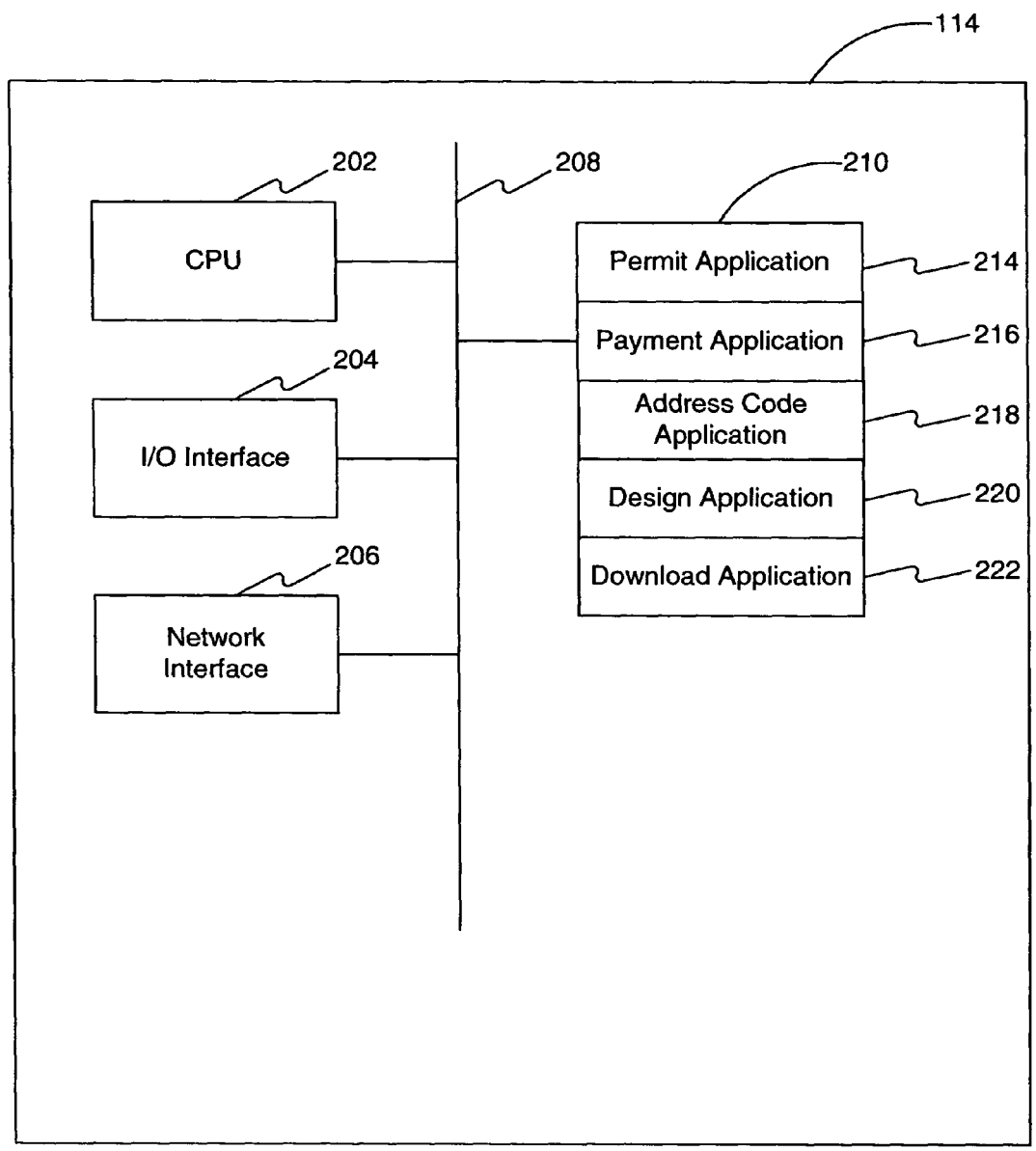
FIG. 2 depicts a block diagram of an exemplary application server, consistent with the present invention.

Application server 114 may be embodied as a data processor, such as a computer, that functions to execute response piece applications. FIG. 2 depicts a block diagram of an exemplary application server 114, in accordance with systems and methods consistent with the present invention. Application server 114 includes at least one central processing unit (CPU) 202, an I/O interface 204, a network interface 206, and memory 210. CPU 202 executes instructions associated with the applications contained in memory 210 and transmits results to other subsystems in application server 114 over a high speed interconnect or data bus 208. I/O interface 204 is an interface used to couple application server 114 with devices, such as a keyboard, a mouse, a display device, and any other I/O device useful in operating and managing application server 114, as is understood by one of skill in the art. Network interface 206 is used to communicate with intranet 120 (FIG. 1).

Memory 210 includes, in one embodiment: a permit application 214 having program instructions that, when executed, receives permit information and generates and stores a response piece permit; a payment application 216 having program instructions that, when executed, receives and processes payment information; an address code application 218 having program instructions that, when executed, receives address code information including an address, standardizes the address, and generates a unique address code; a design application 220 having program instructions that, when executed, receives design information, generates a reply delivery item, such as mail, mailpiece, stores the response piece mailpiece, and delivers the response piece mailpiece to the user; and a download application 222 having program instructions that, when executed, retrieves a stored mailpiece and sends it to the user for downloading and printing.

Referring to FIG. 1, a user may initiate a request to create a response piece by contacting Web server 110 using a Web browser executing on user terminal 102. For example, a user may select to connect to Web server 110 using the Web browser by entering a Uniform Resource Locator (URL) identifying Web server 110 (e.g., www.usps.com). In response, user terminal 102 may contact the Web server 110 via Internet 104, where firewall 108 is programmed to permit information regarding a Web page for the Web server 110 to be sent to the user terminal 102. In response, a Web page is displayed on user terminal 102 using the Web browser.

In one embodiment, Web server 110 sends a Web page prompting a user to select a type of response piece to create. For example, the page may include a button to select a prepaid response piece, such as BRM, and a button to select an unpaid response piece, such as CRM. Web server 110 may also, in one embodiment, send a Web page or Web pages providing information to a mailer describing the various types of response pieces. Such a Web page, or Web pages, may be provided through a link or links as is understood by one of skill in the art.

Figure 3A:
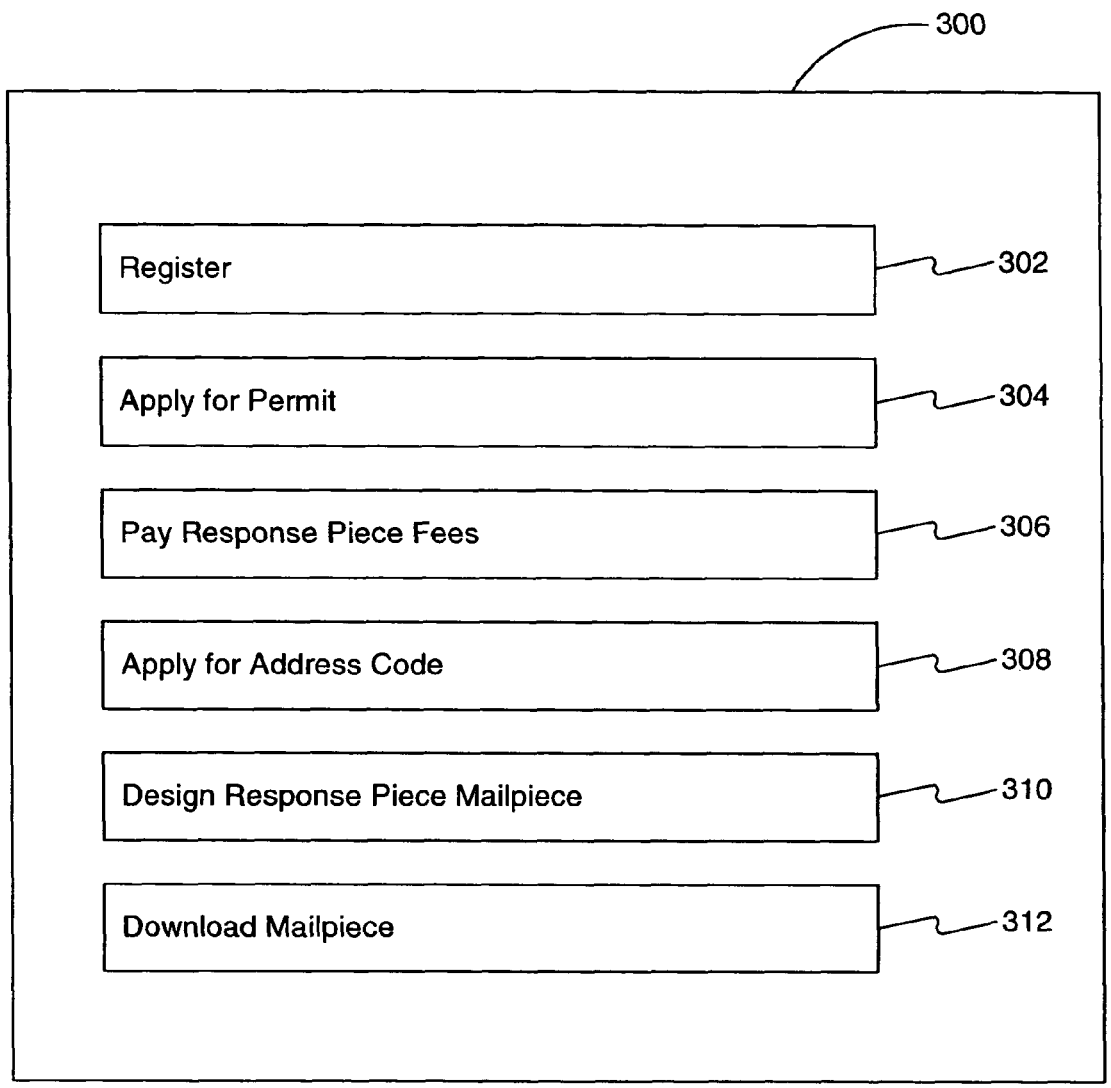
FIG. 3A depicts a diagram of an exemplary computer screen shot for user selection of response piece functions for a prepaid response piece, consistent with the present invention.

FIG. 3A depicts a diagram of an exemplary computer screen shot for user selection of prepaid response piece functions, in accordance with systems and methods consistent with the present invention. A display screen 300 may provide buttons that a user may activate to select the type of service he desires. For example, as illustrated, screen 300 may provide the user with a button 302 to register, a button 304 to apply for a permit, a button 306 to pay response piece fees, a button 308 to apply for an address code, a button 310 to design a response piece mailpiece, and a button 312 to download a mailpiece. A user may then click on the button for the type of service he wishes to request using, for example, a mouse.

Figure 3B:
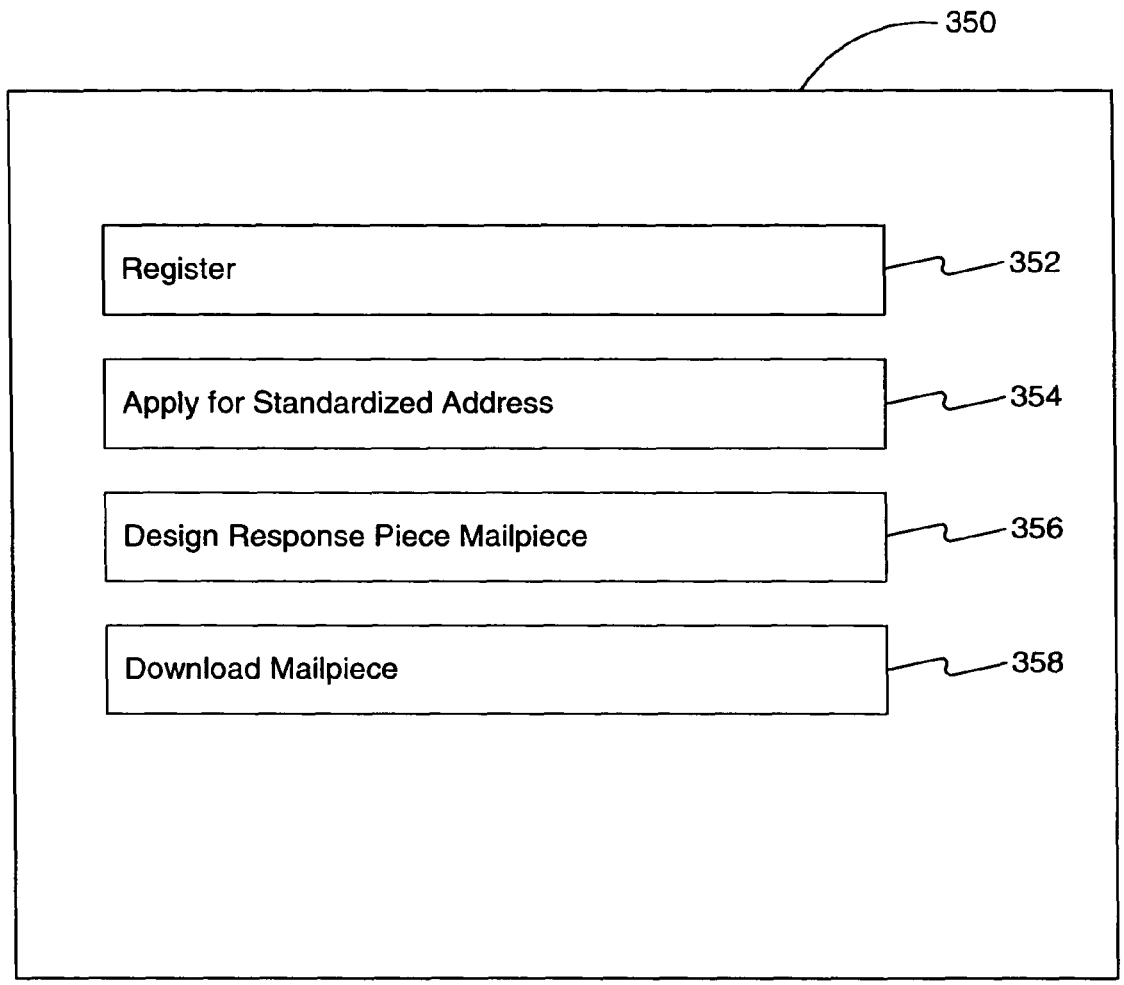
FIG. 3B depicts a diagram of an exemplary computer screen shot for user selection of response piece functions for an unpaid response piece, consistent with the present invention.

FIG. 3B depicts a diagram of an exemplary computer screen shot for user selection of response piece functions for an unpaid response piece, in accordance with systems and methods consistent with the present invention. A display screen 350 may provide buttons that a user may activate to select the type of service he desires. For example, as illustrated, screen 350 may provide the user with a button 352 to register, a button 354 to apply for a standardized address, a button 356 to design a response piece mailpiece, and a button 358 to download a mailpiece. A user may then click on the button for the type of service he wishes to request using, for example, a mouse.

Figure 4:
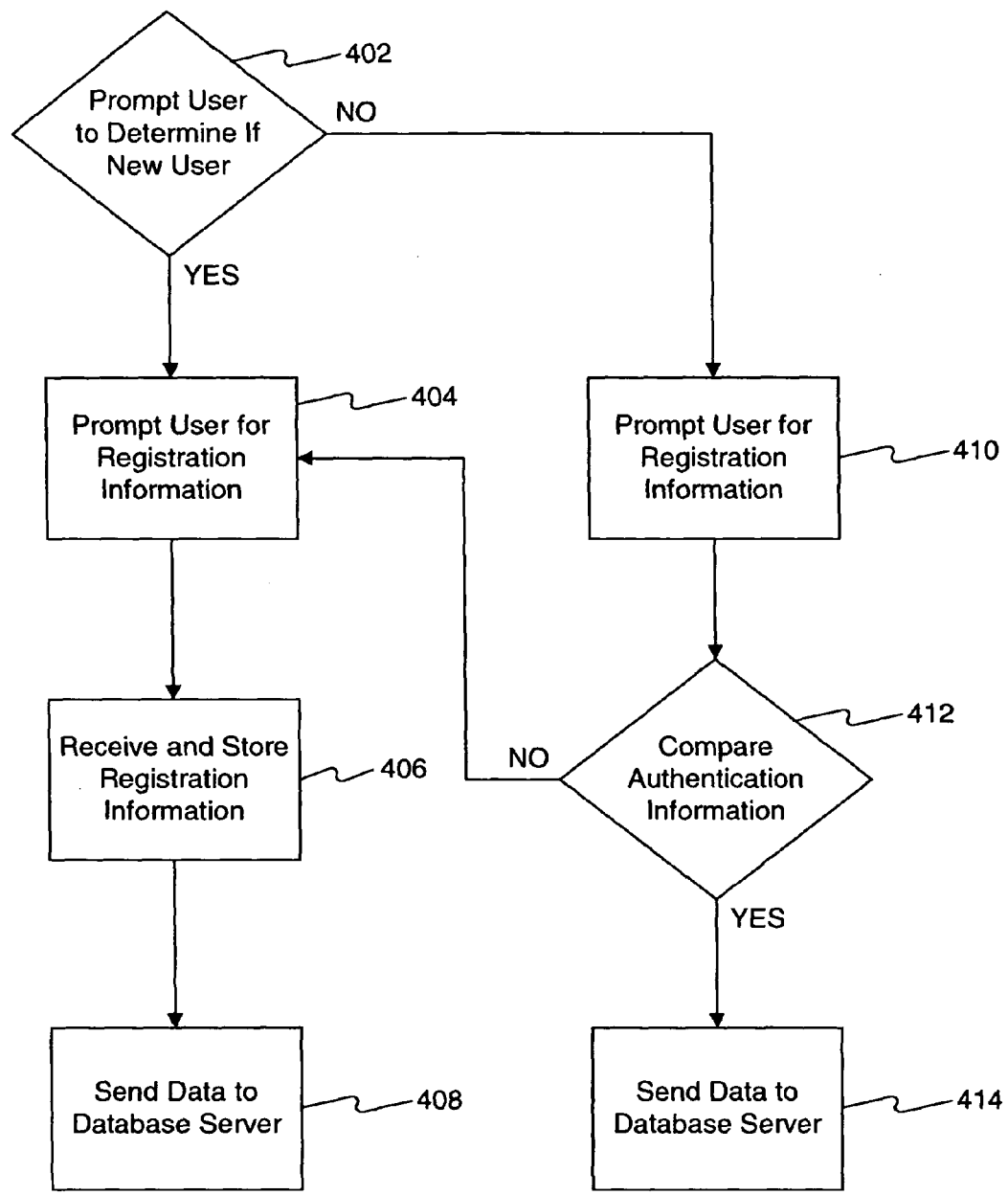
FIG. 4 depicts a flow diagram of an exemplary registration process, consistent with the present invention.

In one embodiment, a user must register before the user can select any of the other response piece services. FIG. 4 depicts a flow diagram of an exemplary registration process, in accordance with systems and methods consistent with the present invention. The flow diagram will be described with reference to the embodiment of the system depicted in FIG. 1 and application server 114 depicted in FIG. 2. First, Web server 110 sends user terminal 102 a Web page to determine (stage 402) if the user is a new user. If the user is a new user, Web server 110 prompts (stage 404) the user to submit registration information, which may include identification information such as the user's name and address, the user's company name, and/or the user's email address. Web server 110 may also prompt the user for information for authentication, such as a user name and a password. Web server 110 may receive the registration information from user terminal 102 and send it to registration system 116. Registration system 116 receives and stores (stage 406) the registration information including the authentication information. In addition, registration system 116 may send (stage 408) user identification data from the registration information, such as the user's name and address and the company name, to database server 118.

If the user is not a new user, Web server 110 may prompt (stage 410) the user for authentication information, such as, for example, a user name and password. Web server 110 sends the authentication information to registration system 116. Registration system 116 compares (stage 412) the received authentication information with authentication information stored in its database to determine if the user is a valid user of automated response piece system 106. If authentication fails, registration system 116 may, through Web server 110, prompt (stage 404) the user to enter registration information. If authentication is successful, registration system 116 may authorize (stage 414) the user to access response piece services provided by application server 114.

Figure 5:
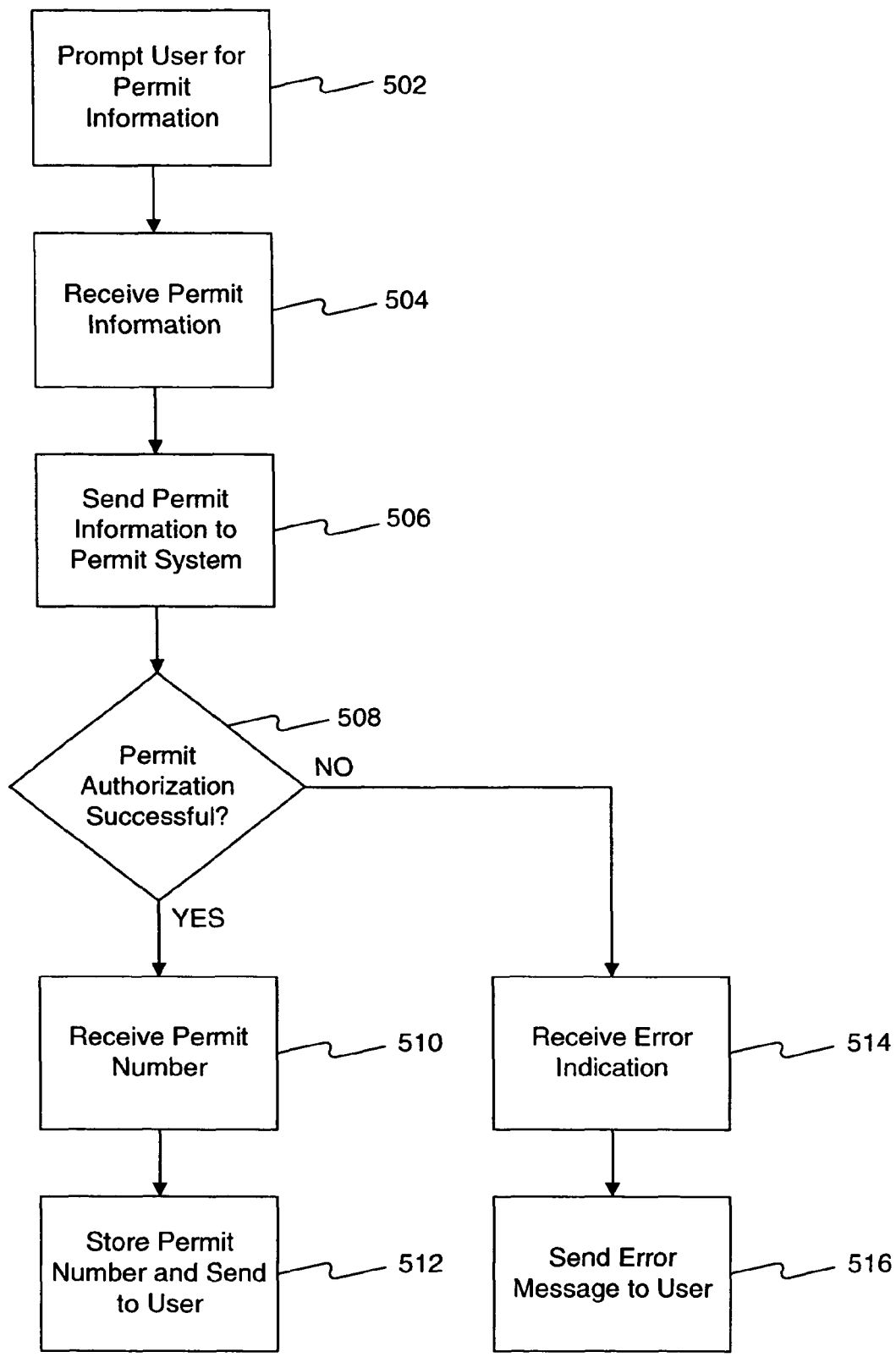
FIG. 5 depicts a flow diagram of an exemplary permit process, consistent with the present invention.

After a user has successfully registered and has been authenticated, if the user has selected to create a prepaid response piece, Web server 110 may resend screen 300 (FIG. 3A) for display to a user, allowing the user to select button 304 to apply for a business reply permit. FIG. 5 depicts a flow diagram of an exemplary permit process, in accordance with systems and methods consistent with the present invention. The flow diagram will be described with reference to the embodiment of the system depicted in FIG. 1 and application server 114 depicted in FIG. 2. Web server 110 prompts (stage 502) a user for permit information. Permit information is any information relating to application for a response piece permit and may include user identification information, such as the user's name, address, and company name, the ZIP code of the issuing post office, the type of permit a user would like to purchase, and payment information. In one embodiment, the different types of permits may be according to the volume of response pieces the user expects to be returned, such as basic BRM, high volume BRM, basic QBRM, or high volume QBRM from the USPS™. Payment information, in one embodiment, may include credit card information debit account information, or ACH account information.

The user enters the permit information and sends it from user terminal 102 to Web server 110, which receives it and forwards it to application server 114. Upon receipt of the permit information, CPU 202 of application server 114 executes permit application 214. Permit application 214 receives (stage 504) the permit information. Permit process 214 then sends (stage 506) the permit information to permit system 122. If permit authorization from permit system 122 was successful (stage 508), permit application 214 receives (stage 510) a valid response piece permit number, stores it in database server 118, and sends (stage 512) it to user terminal 102 through Web server 110. If permit authorization was unsuccessful (stage 508), permit application 214 receives (stage 514) an error indication from permit system 122 and sends (stage 516) an error message identifying the error to user terminal 102 through Web server 110.

Figure 6:
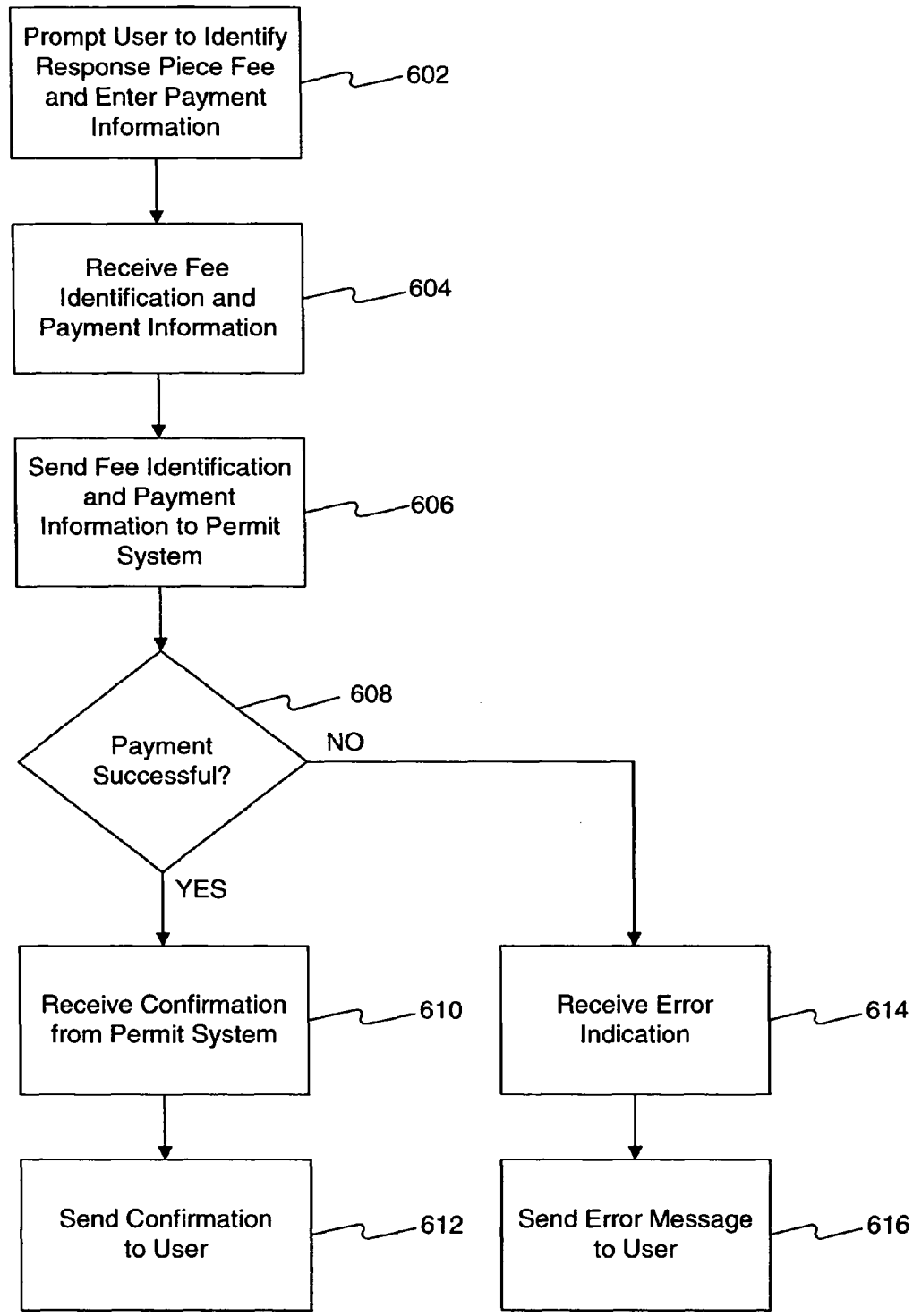
FIG. 6 depicts a flow diagram of an exemplary payment process, consistent with the present invention.

Permits may include periodic fees in addition to the initial application fee. Such fees may include accounting fees or fees related to postage. Referring to FIG. 3A, a user creating a prepaid response piece may pay the response piece permit fees by selecting button 306 of screen 300. FIG. 6 depicts a flow diagram of an exemplary payment process, in accordance with systems and methods consistent with the present invention. The flow diagram will be described with reference to the embodiment of the system depicted in FIG. 1 and application server 114 depicted in FIG. 2. Web server 110 prompts (stage 602) a user to identify the response piece fee and to enter payment information, such as credit card information, debit account information, or ACH account information. In one embodiment, a user may have incurred multiple fees because, for example, a user may own multiple response piece permits. In another embodiment, a user will only pay fees associated with a single permit. The user from the user terminal 102 sends the fee identification and the payment information to Web server 110, which receives it and forwards it to application server 114. Payment application 216 of application server 114, executed by CPU 202, receives (stage 604) the fee identification and the payment information entered and sent by the user. Payment application 216 then sends (stage 606) the fee identification and the payment information to permit system 122. Permit system 122 processes the payment information by, in one embodiment, debiting an account, verifying credit card information, or performing an EFT on an ACH account, as is understood in the art. If payment was successful (stage 608), payment application 216 receives (stage 610) a confirmation from permit system 122. In response, payment application 216 sends (stage 612) a confirmation to user terminal 102 through Web server 110. If payment was unsuccessful (stage 608), payment application 216 receives (stage 614) an error indication from permit system 122, then sends (stage 616) an error message to user terminal 102 through Web server 110.

Figure 7:
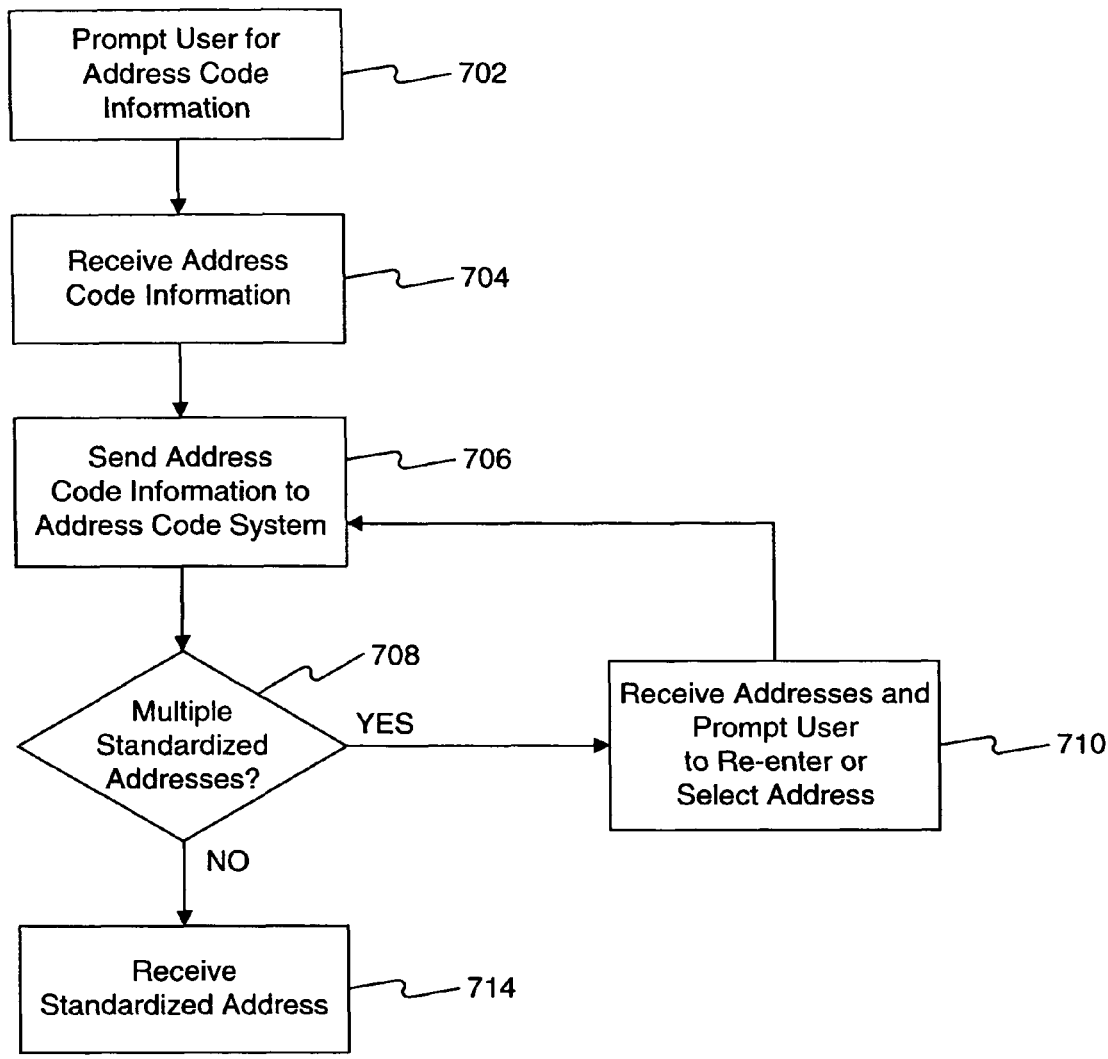
FIG. 7 depicts a flow diagram of an exemplary standardized address process, consistent with the present invention.

The user can receive a standardized address and an address code by selecting button 308 of screen 300 (FIG. 3A) if the user is creating a prepaid response piece, or just a standardized address by selecting button 354 of screen 350 (FIG. 3B) if the user is creating an unpaid response piece. FIG. 7 depicts a flow diagram of an exemplary standardized address process, in accordance with systems and methods consistent with the present invention. The flow diagram will be described with reference to the embodiment of the system depicted in FIG. 1 and application server 114 depicted in FIG. 2. First, Web server 110 prompts (stage 702) a user to provide address code information, which is information associated with applying for a unique address code such as, for example, the user's address including ZIP code and the response piece card or letter type. Web server 110 receives the address code information and forwards it to Web server 110, which sends it to application server 114. Address code application 218 of application server 114, executed by CPU 202, receives (stage 704) the address code information sent by the user and sends (stage 706) the address code information to address code system 124. If address code system 124 determines multiple standardized addresses (stage 708) corresponding to the user's address, address code application 218 receives an indication from address code system 124 and communicates with Web server 110 to prompt (stage 710) the user to re-enter the correct address. In alternative embodiments, address code system 124 can return multiple addresses, which address code application 218 can forward to the user for selection of the appropriate address. After receiving the user's response from Web server 110, address code application 218 can re-send (stage 706) the user's address to address code system 124. After address code system 124 has determined a single standardized address, address code application 218 receives (stage 714) the standardized address from address code system 124. In one embodiment, address code application 218 may also send the standardized address to the user through Web server 110 and store the standardized address in database server 118.

Figure 8:
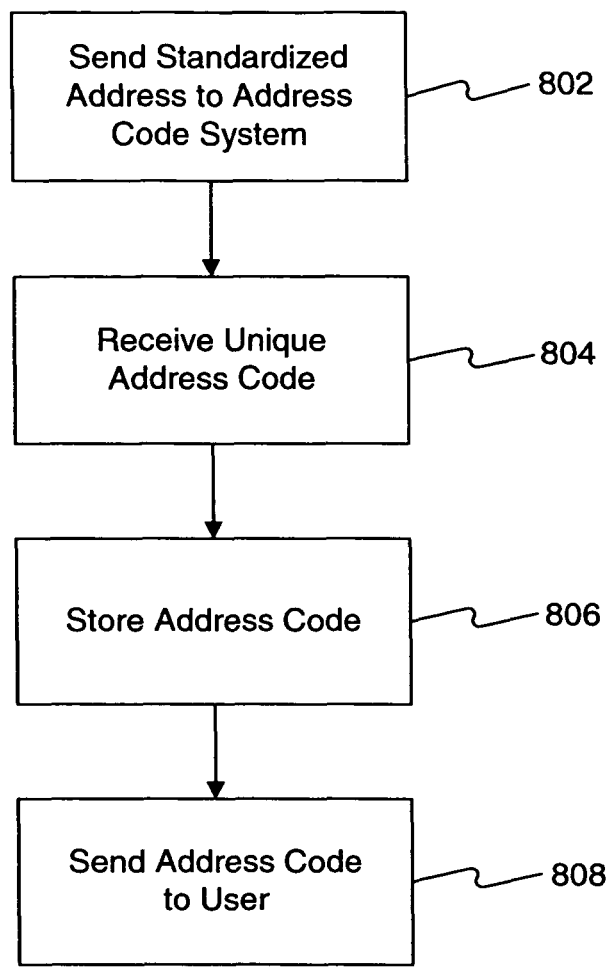
FIG. 8 depicts a flow diagram of an exemplary address code process, consistent with the present invention.

A user creating a prepaid response piece will require a unique address code in addition to a standardized address. FIG. 8 depicts a flow diagram of an exemplary address code process, in accordance with systems and methods consistent with the present invention. The flow diagram will be described with reference to the embodiment of the system depicted in FIG. 1 and application server 114 depicted in FIG. 2. Address code application 218 of application server 114, executed by CPU 206, sends (stage 802) the standardized address to address code system 124. Address code application 218 then receives (stage 804) a unique address code from address code system 124 based on the standardized address and the address code information sent by the user (stage 706 of FIG. 7) and the user's standardized address, generated during standardized address process depicted in FIG. 7. Address code application 218 can then store (stage 806) the unique address code in database server 118 and send (stage 808) the unique address code to the user through Web server 110.

Figure 9:
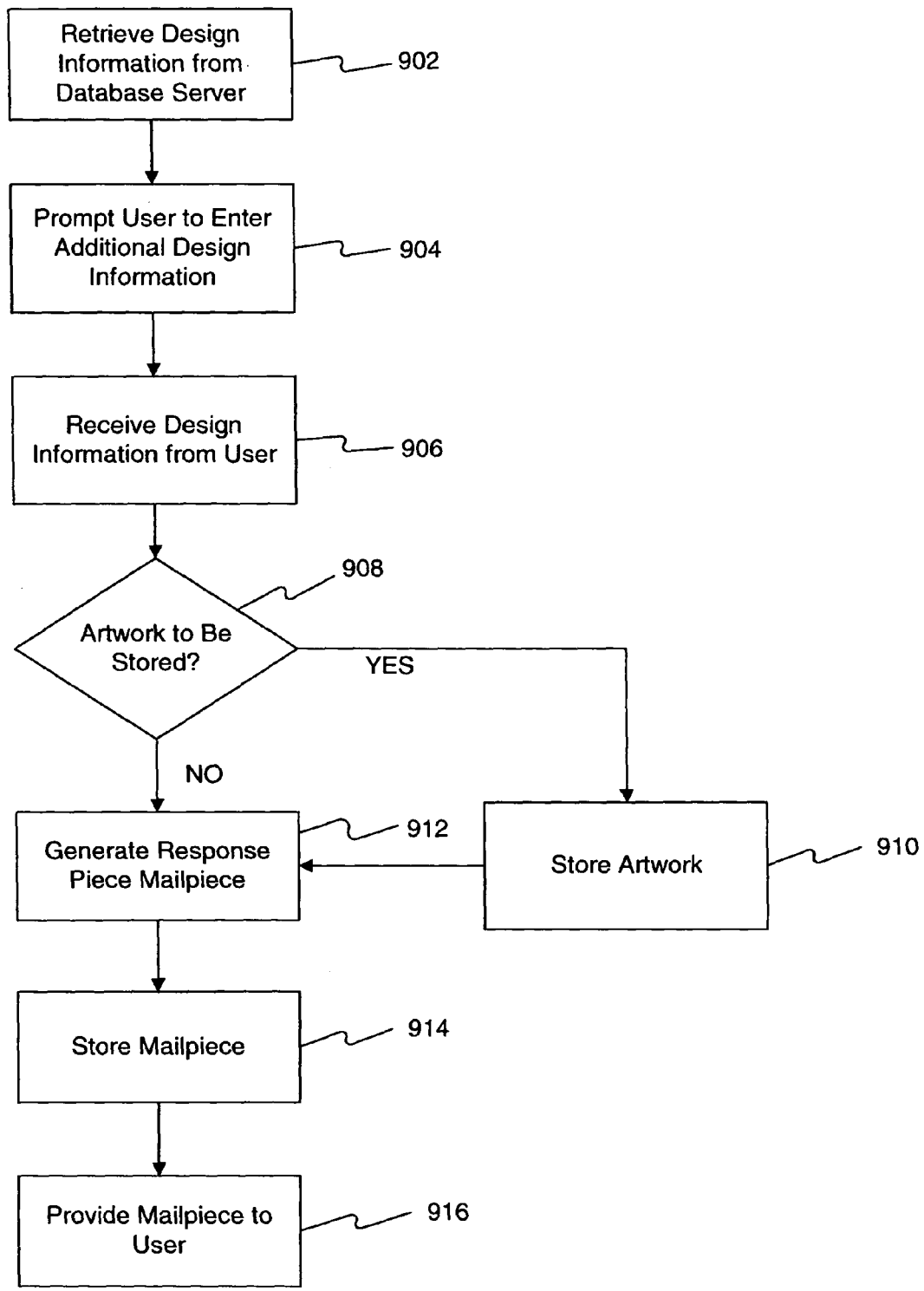
FIG. 9 depicts a flow diagram of an exemplary design process, consistent with the present invention.

After a user creating a prepaid response piece has received a response piece permit and a unique address code, the user can design a response piece mailpiece by selecting button 310 of screen 300 (FIG. 3A). A user creating an unpaid response piece can design a response piece mailpiece after receiving a standardized address by selecting button 356 of screen 350 (FIG. 3B). FIG. 9 depicts a flow diagram of an exemplary design process, in accordance with systems and methods consistent with the present invention. The flow diagram will be described with reference to the embodiment of the system depicted in FIG. 1 and application server 114 depicted in FIG. 2. Upon receiving the user's request to design a response piece mailpiece, CPU 202 of application server 114 executes design application 220. Design application 220 may retrieve (stage 902) design information from the database server 118 to generate the response piece mailpiece. For example, design application 220 may retrieve the user's company name and address, card or letter type, permit number, and address code. For a user creating a prepaid response piece, design application 220 may also retrieve the user's permit number and address code. Design application 220 may also retrieve artwork stored by the user as described below. Design application 220 may use this information to design the response piece mailpiece by, for example, printing the permit number and company information on the mailpiece and also applying the bar code corresponding to the address code. Web server 110 may also prompt (stage 904) a user to enter additional design information, which may include the size of the response piece card or letter, the font type and size, and artwork such as a company's logo. A user may upload the artwork, which may be in any suitable electronic format such as a jpeg or bitmap, as is understood by one of skill in the art. In one embodiment, if the user requests to store the artwork (stage 908), design application 220 receives (stage 906) the user's artwork from Web server 110 and stores (stage 910) it in database server 118.

After retrieving the design information from database server 118 and from the user, design application 220 can generate (stage 912) the response piece mailpiece according to response piece specifications. An example of response piece specifications can be found in the Domestic Mail Manual from the USPS™, which is hereby expressly incorporated by reference. As set forth above, a response piece mailpiece will include a bar code corresponding to the address code. A prepaid response piece mailpiece will also include a permit number.

In addition, design application 220 can generate a response piece mailpiece that includes additional bar codes or additional unique optically-readable codes, such as the PLANET® or POSTNET® codes, currently in use by the USPS™, for alerting mail processing equipment to perform a function on the response piece when it is returned. An example of such a code is a Face Identification Marking (FIM) code that alerts mail processing equipment to sort the response pieces based on the postage requirements. Other codes may be particularly useful for users creating a prepaid response piece because the codes can alert the mail processing equipment to record return of the mailpiece for billing purposes or to read information from the returned mailpiece to provide to the user. An example of such information may include a customer name and address, subscription information, and/or payment information. Mail processing equipment refers to equipment that processes a response piece when it is returned, which may perform a function on the response piece when it reads a certain code. An example of such mail processing equipment is the Advanced Facer Canceller System (AFCS) used by the USPS™.

Design application 220 generates the response piece mailpiece in any suitable design format such as the file formats used by Adobe Illustrator or Macromedia Freehand, as is understood by those skilled in the art. In one embodiment, design application 220 can then store (stage 914) the response piece mailpiece in database server 118 and provide (stage 916) the mailpiece to user terminal 102 through web server 110. In one embodiment, a user can download the response piece mailpiece to user terminal 102 through Internet 104. In other embodiments, design application 220 can electronically mail the response piece mailpiece to an email address provided by the user. The user, through user terminal 102, may also provide a name for the mailpiece, which design application 220 can associate with the stored mailpiece for subsequent reference by the user.

Figure 10:
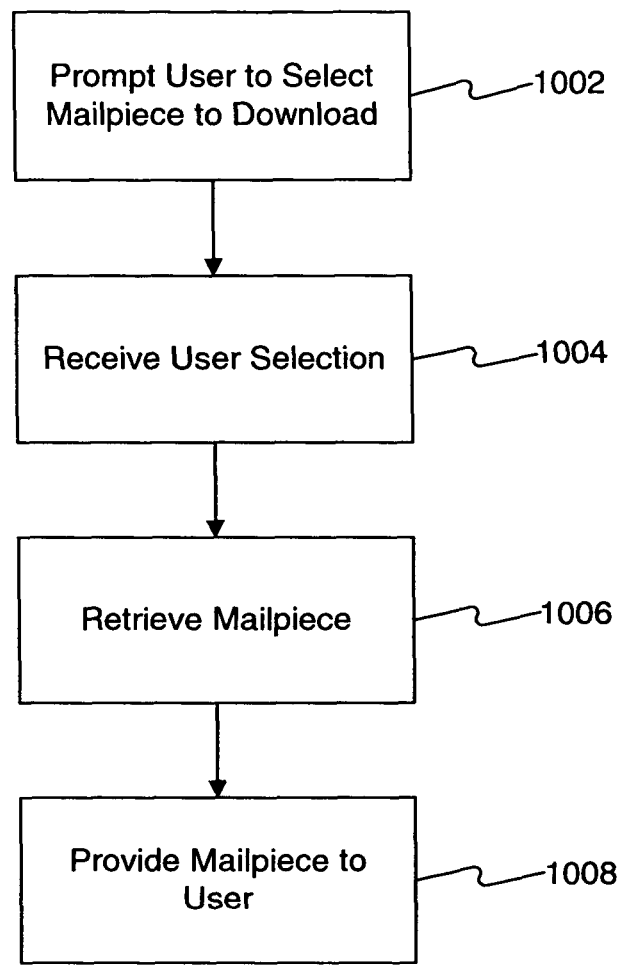
FIG. 10 depicts a flow diagram of an exemplary download process, consistent with the present invention.

A user can download a saved response piece mailpiece for editing or printing by selecting button 312. Upon receiving the user's request to download a mailpiece, CPU 202 of application server 114 executes download application 222. FIG. 10 depicts a flow diagram of an exemplary download process, in accordance with systems and methods consistent with the present invention. The flow diagram will be described with reference to the embodiment of the system depicted in FIG. 1 and application server 114 depicted in FIG. 2. Download application 222, through Web server 110, prompts (stage 1002) a user to select the mailpiece to download. Upon receiving (stage 1004) the selection, download application 222 retrieves (stage 1006) the selected mailpiece from database server 118 and provides (stage 1008) it to user terminal 102. In one embodiment, a user can download the response piece mailpiece to user terminal 102 through Internet 104. In other embodiments, download application 222 can electronically mail the response piece mailpiece to an email address provided by the user.

Figure 11:
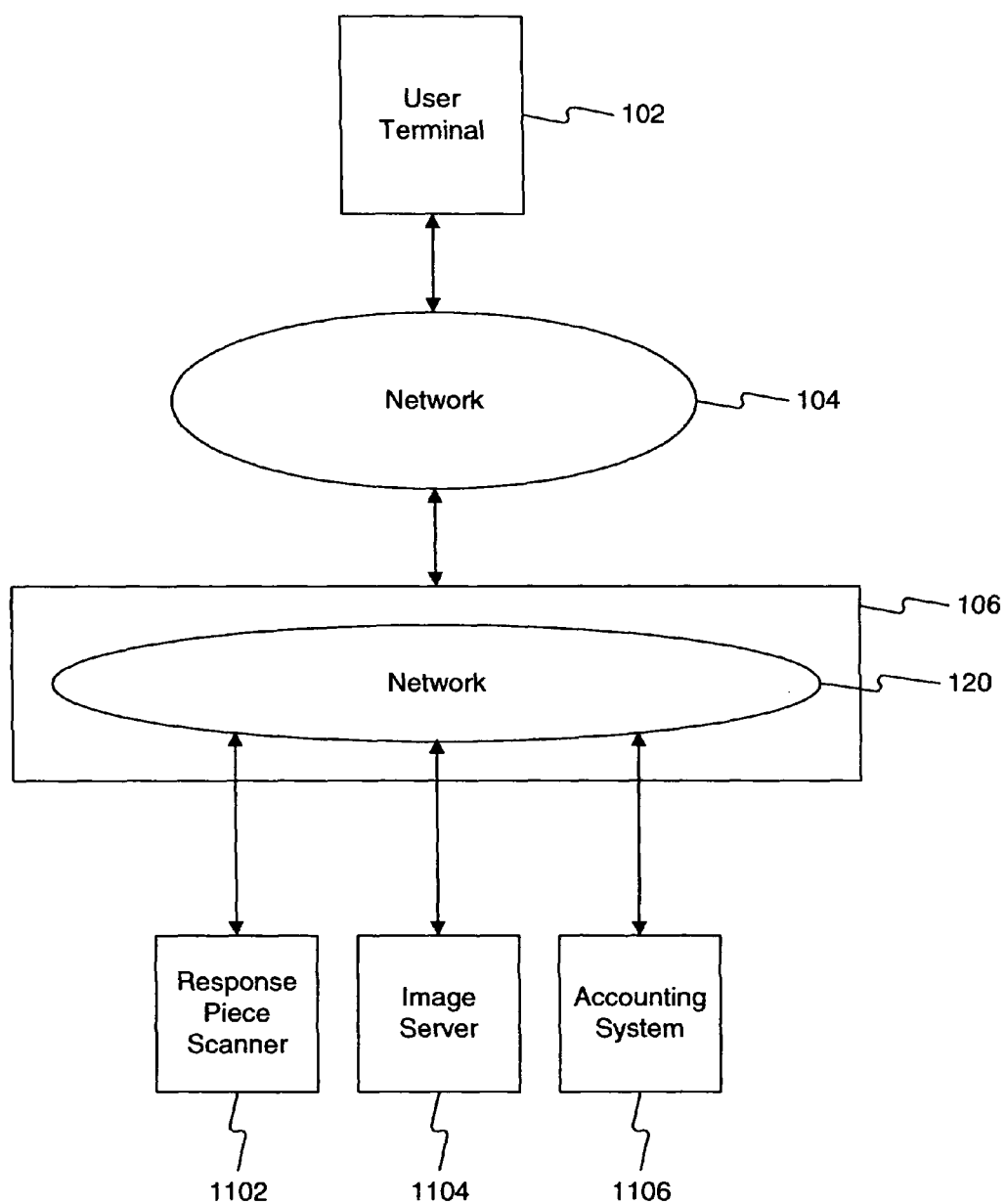
FIG. 11 is an exemplary system environment, consistent with the present invention.

FIG. 11 is an exemplary system environment, consistent with the present invention. As illustrated, user terminal 102 connects to Internet 104. Automated response piece system 106 connects to Internet 104, as described regarding FIG. 1. Response mail scanner 1102, image server 1104, and accounting system 1106 connect to intranet 120 of automated response piece system 106.

Response piece scanner 1102 functions to generate images of incoming response pieces. In one embodiment, response piece scanner 1102 is incorporated into mail processing equipment such as an AFCS. AFCS places an incoming mailpiece into a single file line in a pinch belt, checks for appropriate postage on the mailpiece, cancels the postage, and places the mailpiece in stackers. AFCS includes software for reading optically-readable codes on the mailpiece, including POSTNET® and PLANET® codes. When processing an incoming response piece, if an AFCS reads a particular optically-readable code, it can generate an image of the mailpiece using imaging software, such as optical character recognition software. AFCS can include an interface for communicating with Intranet 120 to send images to image server 1104. In alternative embodiments, response piece scanner 1102 can be embodied as a separate scanning workstation, such as a flatbed scanner, or any other appropriate image acquisition device, as is understood by one of ordinary skill in the art. Upon reading the optically-readable code, AFCS can remove the response piece to be imaged from the mail flow and the response piece can be transferred to a separate scanning workstation that can generate the image. The scanning workstation can then send images to image server 1104.

Accounting system 1106 functions to manage the accounts for users who create response pieces for scanning. Accounting system 1106 may be implemented as a computer or network of computers and a database or set of databases that manages the accounts for mailers of a prepaid response pieces. In one embodiment, accounting system 1106 may also receive response piece identification information indicating the return of a response piece and debits the account corresponding to the returned response piece. In one embodiment, for each prepaid response piece, accounting system 1106 can provide for each user an indication of the number of prepaid response pieces returned by third parties and the amount of postage to be paid. In one embodiment, a user can access information from accounting system 1106 through automated response piece system 106. An example of accounting system 1106 is the USPS's Automated Accounting System.

Figure 12:
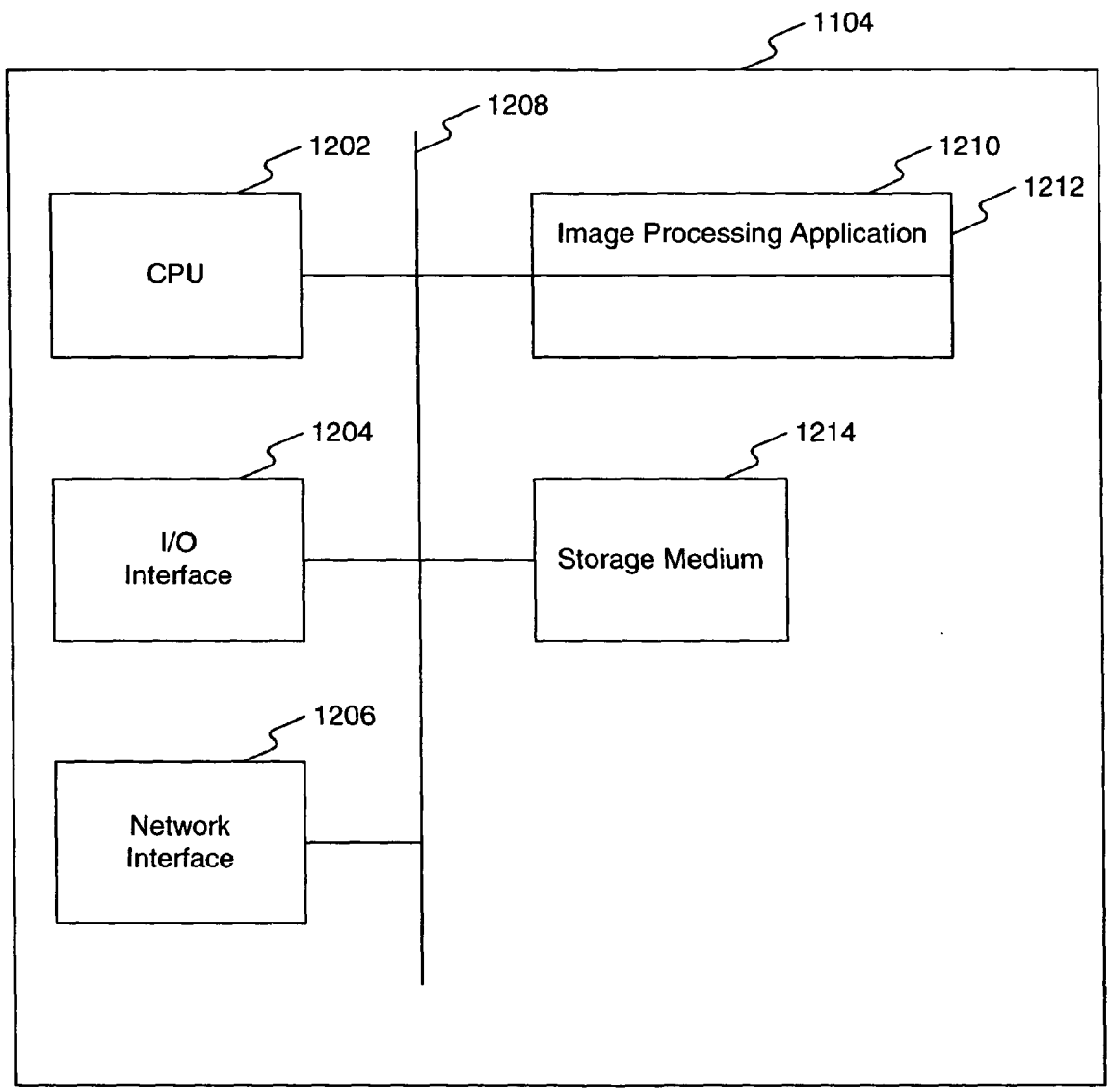
FIG. 12 depicts a block diagram of an exemplary application server 1104, consistent with the present invention.

Image server 1104 may be embodied as a data processor, such as a computer, that functions to execute response piece imaging and data processing functions. FIG. 12 depicts a block diagram of an exemplary application server 1104, in accordance with systems and methods consistent with the present invention. Image server 1104 includes at least one CPU 1202, an I/O interface 1204, a network interface 1206, memory 1210, and storage medium 1214. CPU 1202 executes instructions associated with the applications contained in memory 1210 and transmits results to other subsystems in image server 1104 over a high speed interconnect or data bus 1208. I/O interface 1204 is an interface used to couple image server 1104 with devices such as a keyboard, a mouse, a display device, and any other I/O device useful in operating and managing image server 1104, as is understood by one of skill in the art. Network interface 1206 is used to communicate with intranet 120 (FIG. 11). Storage medium 1214 is any medium for storing information such as a magnetic or optical storage medium. In one embodiment, storage medium 1214 may store information that can be accessed through a conventional database protocol, such as SQL. Memory 1210 includes, in one embodiment, an image processing application 1212 having program instructions that, when executed, processes a received image as described below.

Figure 13:
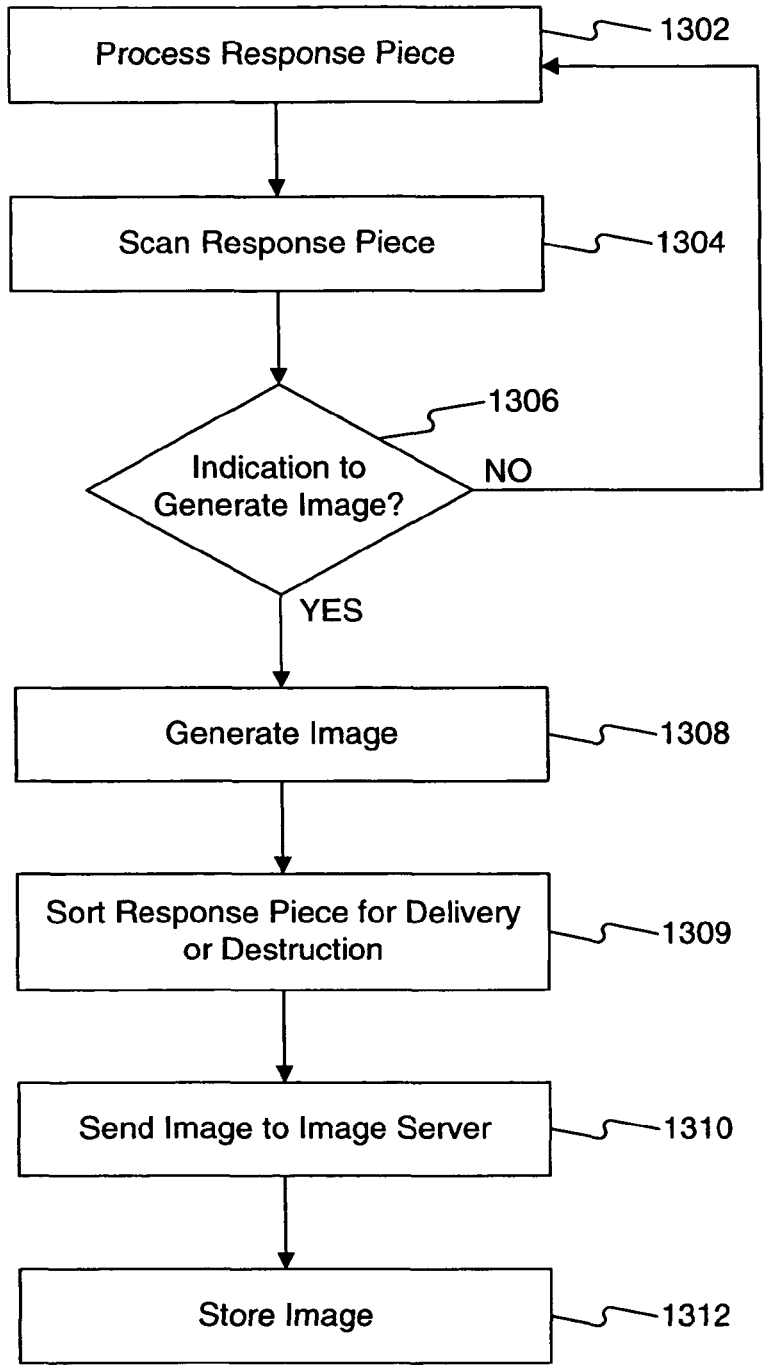
FIG. 13 depicts a flow diagram of an exemplary response piece scanning process, consistent with the present invention.

FIG. 13 depicts a flow diagram of an exemplary response piece scanning process, in accordance with systems and methods consistent with the present invention. AFCS processes (stage 1302) and scans (stage 1304) an incoming response piece. If AFCS reads an optically readable code indicating the response piece should be imaged (stage 1306), then AFCS generates (stage 1308) the image. The optically readable code, as set forth above, may be in one embodiment a PLANET® code. For example, if AFCS scans a response piece including a code indicating it should create an image, AFCS generates the image and sends it to image server 1104. If AFCS does not read such a code, it processes the next mailpiece. In one embodiment, then AFCS generates an image in any suitable electronic format, such as a jpeg or bitmap, as is understood by one of skill in the art.

After generating the image, AFCS can sort (stage 1309) the response piece for delivery to the user or for destruction. A user can make the determination to deliver the response piece or to sort it upon creation of the response piece. The user's determination will be indicated by the optically readable code. The AFCS can then send (stage 1310) the image to image server 1104.

Figure 14:
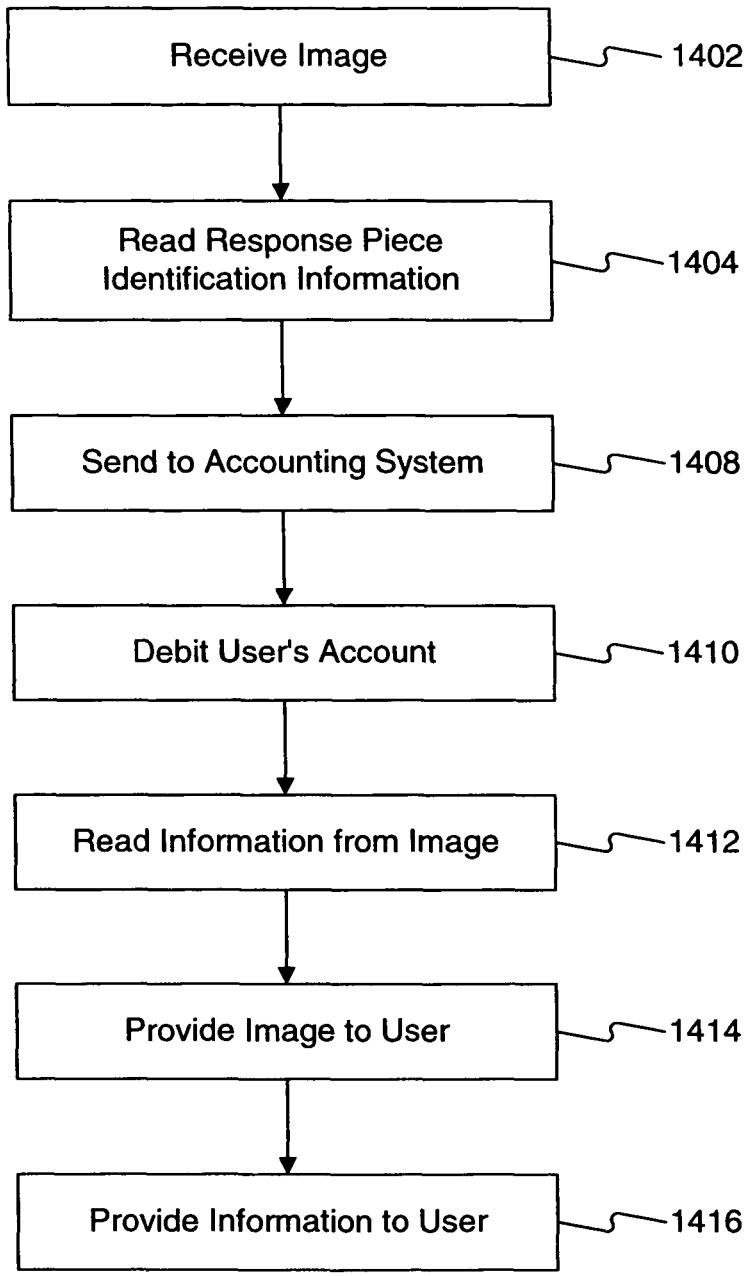
FIG. 14 depicts a flow diagram of an exemplary response piece processing process, consistent with the present invention.

FIG. 14 depicts a flow diagram of an exemplary response piece processing process, in accordance with systems and methods consistent with the present invention. Image server 1104 receives the image from AFCS (stage 1402). In one embodiment, image processing application reads response piece identification information from the image (stage 1404). The response piece identification information can include, in one embodiment, the unique address code and/or any optically readable code identifying the mailpiece. Image processing application can send the response piece identification information to accounting system 1106 (stage 1408). Accounting system 1106 receives the response piece identification information and debits the account associated with the response piece (stage 1410).

In one embodiment, image processing application can read information from the scanned response piece (stage 1412). For example, image processing application can read information associated with a customer or subscriber. Image processing application uses, for example, optical character recognition software. For example, a response piece may be returned by a magazine subscriber. Image processing application can read information from the response piece provided by the magazine subscriber.

Image processing application 1104 can then provide (stage 1414) the image to a user by sending the image with the response piece identification information to database server 118 (FIG. 1) through Internet 104. A user can access and download images from database server 118 through automated response piece system 106, as is understood. In an alternative embodiment, image server 1104 can provide the image to a user by any suitable means, such as by email or by sending the image to any data processor having an interface to the Internet such as a Web server.

Image processing application 1104 can also provide the information read from the response piece to a user by sending the information to database server 118 (stage 1416). A user can then download this information in one embodiment through automated response piece system 106, as is understood.

Image processing application 1104 can then store (stage 1416) the image in storage medium 1214. Images may be stored for any amount of time, depending upon the business requirements of the user.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on, or read from, other types of computer-readable media, such as secondary storage devices, like hard disks, floppy disks, or a CD-ROM, a carrier wave from the Internet, or other forms of RAM or ROM. Further, the stages of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for retrieving information from a response piece comprising:
   electronically scanning, by a computer, the response piece during delivery item processing;
   reading, during the scanning, an optically-readable code indicating that the response piece should be imaged;
   generating an image of the response piece;
   processing, by the computer, the image to determine information identifying the response piece and sending the response piece identification information to an automated accounting system, wherein the response piece identification information includes an address;
   standardizing, by the computer, the address and generating a unique address code based on the standardized address;
   debiting, by the computer, an account of a creator of the response piece for the response piece by the accounting system, the account corresponding to the response piece identification information; and
   providing the image to the creator of the response piece.

2. The method of claim 1, wherein the method further comprises receiving a confirmation indicating that an account was successfully debited.

3. The method of claim 2, further comprising sending the information read from the response piece to the creator.

4. The method of claim 1, further comprising generating the response piece according to response piece specifications.

5. The method of claim 4, further comprising incorporating artwork into the response piece.

6. The method of claim 1, further comprising debiting an account corresponding to the response piece identification information sorting the response piece for destruction based on an indication in the optically-readable code.

7. The method of claim 1, further comprising storing an image of the response piece for subsequent access.

8. The method of claim 1, further comprising sending the response piece to the user in a format such that the creator can download and/or print the response piece.

9. The method of claim 1, wherein the response piece identification information includes a unique address code.

10. A system for analyzing a response piece comprising:
a response piece scanner comprising software for:
   electronically scanning the response piece;
   reading, during the scanning, an optically-readable code indicating that the response piece should be imaged; and
   generating an image of the response piece; and
an image server comprising:
   a central processing unit; and
   an image processing application configured for execution by the central processing unit comprising instructions for processing the image to determine information identifying the response piece, wherein the information identifying the response piece includes an address, standardizing the address and generating a unique address code based on the standardized address, sending the response piece identification information to an automated accounting system, and providing the image to a creator of the response piece,
   wherein upon receiving the response piece identification information, the automated accounting system debits an account of the creator for the response piece, the account corresponding to the response piece identification information, 11. The system of claim 10, wherein the response piece scanner is incorporated into delivery item processing equipment.

12. The system of claim 11, wherein the delivery item processing equipment comprises mail processing equipment.

13. The system of claim 11, wherein the mail processing equipment comprises an Advanced Facer Canceller System.

14. The system of claim 10, further comprising generating the response piece according to response piece specifications.

15. The system of claim 14, further comprising incorporating artwork into the response piece.

16. The system of claim 10, wherein the image processing application is further configured to receive a confirmation indicating that an account was successfully debited.

17. The system of claim 10, wherein the instructions for processing the image comprise instructions for sending the information read from the response piece to the creator.

18. The system of claim 10, further comprising storing an image of the response piece for subsequent access.

19. The system of claim 10, further comprising sending the response piece to the user in a format such that the creator can download and/or print the response piece.

20. The system of claim 10, wherein the response piece identification information includes a unique address code.

21. A non-transitory computer-readable storage medium encoded with instructions that, when executed on a processor, perform a method for creating a response mail piece, the method comprising:
   electronically scanning, by a computer the response piece during mail processing;
   reading, during the scanning, an optically-readable code indicating that the response piece should be imaged;
   generating an image of the response piece;
   processing, by the computer, the image to determine information identifying the response piece and sending the response piece identification information to an automated accounting system wherein the response piece identification information includes an address;
   standardizing, by, the computer, the address and generating unique address code based on the standardized address
   debiting, by the computer, an account of a creator of the response piece for the response piece by the accounting system, the account corresponding to the response piece identification information;
   storing the image in a memory; and
   providing the image to the creator of the response piece.

22. The computer-readable storage medium of claim 21, wherein the method further comprises receiving a confirmation indicating that an account was successfully debited.

23. The computer-readable storage medium of claim 22, wherein the method further comprises sending the information read from the response piece to the creator.

24. The computer-readable storage medium of claim 21, wherein the method further comprises sorting the response piece for destruction based on an indication in the optically-readable code debiting an account corresponding to the response piece identification information.

25. The computer-readable storage medium of claim 21, wherein the method further comprises generating the response piece according to response piece specifications.

26. The computer-readable storage medium of claim 25, wherein the method further comprises incorporating artwork into the response piece.

27. The computer-readable storage medium of claim 21, wherein the method further comprises sending the response piece to the user in a format such that the user can download and/or print the response piece.

28. The computer-readable storage medium of claim 21, wherein the response piece identification information includes a unique address code.

* * * * *